United States Patent
Chavva et al.

(10) Patent No.: US 12,034,566 B2
(45) Date of Patent: Jul. 9, 2024

(54) METHOD AND SYSTEM TO SELECTIVELY FLUSH FILTERING DATABASES IN A MAJOR RING OF AN ETHERNET RING PROTECTION SWITCHING NETWORK

(71) Applicant: Telefonaktiebolaget LM Ericsson (publ), Stockholm (SE)

(72) Inventors: Gangadhara Reddy Chavva, Bengaluru (IN); Rajesh Kumar Meduri, Bangalore (IN); Nallamothu Pardhasaradhi, Bangalore (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 453 days.

(21) Appl. No.: 17/423,421

(22) PCT Filed: Jan. 25, 2019

(86) PCT No.: PCT/IN2019/050057
§ 371 (c)(1),
(2) Date: Jul. 15, 2021

(87) PCT Pub. No.: WO2020/152693
PCT Pub. Date: Jul. 30, 2020

(65) Prior Publication Data
US 2022/0094569 A1 Mar. 24, 2022

(51) Int. Cl.
*H04L 12/42* (2006.01)
*H04L 41/12* (2022.01)

(52) U.S. Cl.
CPC .......... *H04L 12/42* (2013.01); *H04L 41/12* (2013.01); *H04L 2012/421* (2013.01)

(58) Field of Classification Search
CPC .... H04L 12/42; H04L 41/12; H04L 2012/421
See application file for complete search history.

(56) References Cited

U.S. PATENT DOCUMENTS

| | | |
|---|---|---|
| 2010/0226245 A1 | 9/2010 | Ryoo et al. |
| 2014/0064063 A1 | 3/2014 | Holness et al. |

(Continued)

FOREIGN PATENT DOCUMENTS

KR 2010-0129712 A 12/2010

OTHER PUBLICATIONS

Nurujjaman et al. "Optimal Capacity Provisioning for Survivable Next Generation Ethernet Transport Networks" J. Opt. Commun. Netw. Dec. 2012 (Year: 2012).*

(Continued)

*Primary Examiner* — Basil Ma
(74) *Attorney, Agent, or Firm* — Sonoda & Kobayashi Intellectual Property Law; Sarvajit S. Patil (57) ABSTRACT

Methods and systems to operate an Ethernet ring protection switching (ERPS) network. In one embodiment, a method performed by a network device in the ERPS network device is disclosed. The ERPS network comprises a major ring and a sub-ring, where the network device is a first interconnection network device that is on both major ring and sub-ring. The method comprises determining that a topology change notification is received from the sub-ring, identifying a link that is coupled to the network device and that is towards a second interconnection network device, where the second interconnection network device is also on both major ring and sub-ring. The method further comprises terminating the topology change notification and transmitting a first message using the link towards the second interconnection network device, where the first message is a filtering database (FDB) flush message.

20 Claims, 6 Drawing Sheets

(56) References Cited

U.S. PATENT DOCUMENTS

| | | | |
|---|---|---|---|
| 2014/0064064 A1* | 3/2014 | Kim | H04L 45/28 370/225 |
| 2014/0317248 A1 | 10/2014 | Holness et al. | |
| 2015/0207668 A1* | 7/2015 | Civil | H04L 41/0654 370/223 |
| 2017/0155575 A1* | 6/2017 | Bertucci | H04L 12/42 |
| 2018/0062974 A1* | 3/2018 | Singh | H04L 45/02 |
| 2019/0020500 A1* | 1/2019 | She | H04L 45/22 |

OTHER PUBLICATIONS

Lee et al. "An Ethernet Ring Protection Method to Minimize Transient Traffic by Selective FDB Advertisement" ETRI Journal Oct. 2009 (Year: 2009).*
European Search Report and Search Opinion, EP App. No. 19911689.8, Dec. 17, 2021, 7 pages.
International Preliminary Report on Patentability, PCT App. No. PCT/IN2019/050057, Aug. 5, 2021, 7 pages.
International Search Report and Written Opinion, PCT App. No. PCT/IN2019/050057, May 2, 2019, 9 pages.
International Telecommunication Union, "Series G: Transmission Systems and Media, Digital Systems and Networks: Packet over Transport aspects—Ethernet over Transport aspects; Series Y: Global Information Infrastructure, Internet Protocol Aspects and Next-Generation Networks: Internet protocol aspects—Transport", ITU-T, G.8032/Y.1344, Aug. 2015, 82 pages.

\* cited by examiner

METHOD AND SYSTEM TO SELECTIVELY FLUSH FILTERING DATABASES IN A MAJOR RING OF AN ETHERNET RING PROTECTION SWITCHING NETWORK

CROSS-REFERENCE TO RELATED APPLICATIONS

This application is a National stage of International Application No. PCT/IN2019/050057, filed Jan. 25, 2019, which is hereby incorporated by reference.

TECHNICAL FIELD

Embodiments of the present disclosure relate to the field of networking, and more specifically, relate to methods and systems to selectively flush filtering databases in a major ring of an Ethernet ring protection switching network.

BACKGROUND ART

Ethernet ring protection switching (ERPS) is a protocol aiming at providing less than 50 milliseconds (ms) protection and recovery switching for Ethernet traffic in a ring topology, while ensuring no loops formed at the Ethernet layer at the same time. As Ethernet rings can provide wide area connectivity economically, ERPS has seen broad adaption, and a series of standards, such as "International Telecommunication Union (ITU-T) G.8032: Ethernet ring protection switching," approved on Aug. 13, 2015, further accelerates the implement ERPS networks.

Key components of ERPS include the principle of loop avoidance and the utilization of learning, forwarding and filtering database (FDB) mechanisms defined in an Ethernet flow forwarding function (ETH_FF). A state change (e.g., a ring link failure) in a ring may trigger a node in the ring to flush its existing FDB and learn the resulting new topology.

ERPS may be implemented in a network including multiple rings, such as a major ring coupled to a set of sub-rings. When the state of a sub-ring changes, the major ring is notified of the changes by a topology change notification. The topology change notification causes all the receiving nodes on the major ring to flush their respective filtering databases.

SUMMARY

Embodiments of the invention offer efficient ways to operate an Ethernet ring protection switching (ERPS) network. In one embodiment, a method performed by a network device in the ERPS network device is disclosed. The ERPS network comprises a major ring and a sub-ring, where the network device is a first interconnection network device that is on both major ring and sub-ring. The method comprises determining that a topology change notification is received from the sub-ring, identifying a link that is coupled to the network device and that is towards a second interconnection network device, where the second interconnection network device is also on both major ring and sub-ring. The method further comprises terminating the topology change notification and transmitting a first message using the link towards the second interconnection network device, where the first message is a filtering database (FDB) flush message.

Embodiments of the invention include network devices to operate an Ethernet ring protection switching (ERPS) network. In one embodiment, a network device comprising a processor and computer-readable storage medium is disclosed. The computer-readable storage medium provides instructions that, when executed by the processor, cause the network device to perform: determining that a topology change notification is received from the sub-ring, identifying a link that is coupled to the network device and that is towards a second interconnection network device, where the second interconnection network device is also on both major ring and sub-ring; terminating the topology change notification and transmitting a first message using the link towards the second interconnection network device, where the first message is a filtering, database (FDB) flush message.

Embodiments of the invention include machine-readable storage media that provide instructions (e.g., computer program) that, when executed by a processor of an electronic device, cause the electronic device to perform operations comprising one or more methods of the embodiments of the invention.

Through selectively flushing filtering databases in a major ring of an Ethernet ring protection switching (ERPS) network, embodiments of the invention limit FDB flushing to interconnection nodes and the one or more major ring nodes between them on the major ring. The limited FDB flushing prevents unnecessary message flooding and service outage on the major ring due to a topology change of its sub-ring.

BRIEF DESCRIPTION OF THE DRAWINGS

The invention may best be understood by referring to the following description and accompanying drawings that illustrate embodiments of the invention.

DETAILED DESCRIPTION

The following description describes methods, apparatus, and computer programs to prevent unnecessary message flooding and service outage on the major ring due to a topology change of its sub-ring. In the following description, numerous specific details such as logic implementations, opcodes, means to specify operands, resource partitioning/sharing/duplication implementations, types and interrelationships of system components, and logic partitioning/integration choices are set forth to provide a more thorough understanding of the present invention. One skilled in the art will appreciate, however, that the invention may be practiced without such specific details. In other instances, control structures, gate level circuits, and full software instruction sequences have not been shown in detail in order not to obscure the invention. Those of ordinary skill in the art, with the included descriptions, will be able to implement proper functionality without undue experimentation.

Bracketed text and blocks with dashed borders (such as large dashes, small dashes, dot-dash, and dots) may be used to illustrate optional operations that add additional features to the embodiments of the invention. Such notation, however, should not be taken to mean that these are the only options or optional operations, and/or that blocks with solid borders are not optional in some embodiments of the invention.

Terms

Generally, all terms used herein are to be interpreted according to their ordinary meaning in the relevant technical field, unless a different meaning is clearly given and/or is implied from the context in which it is used. All references to a/an/the element, apparatus, component, means, step, etc., are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

References in the specification to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following description and claims may use the terms "coupled" and "connected," along with their derivatives. These terms are not intended as synonyms for each other. "Coupled" is used to indicate that two or more elements, which may or may not be in direct physical or electrical contact with each other, co-operate or interact with each other, "Connected" is used to indicate the establishment of wireless or wireline communication between two or more elements that are coupled with each other. A "set," as used herein, refers to any positive whole number of items including one item.

An electronic device stores and transmits (internally and/or with other electronic devices over a network) code (which is composed of software instructions and which is sometimes referred to as a computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., of which a processor is a microprocessor, controller, microcontroller, central processing unit, digital signal processor, application specific integrated circuit (ASIC), field programmable gate array (FPGA), other electronic circuitry, or a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed). When the electronic device is turned on, that part of the code that is to be executed by the processor(s) of the electronic device is typically copied from the slower non-volatile memory into volatile memory (e.g., dynamic random-access memory (DRAM), static random-access memory (SRAM)) of the electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of (1) receiving data from other electronic devices over a wireless connection and/or (2) sending data out to other devices through a wireless connection. This radio circuitry may include transmitter(s), receiver(s), and/or transceiver(s) suitable for radio frequency communication. The radio circuitry may convert digital data into a radio signal having the proper parameters (e.g., frequency, timing, channel, bandwidth, and so forth). The radio signal may then be transmitted through antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate with wire through plugging in a cable to a physical port connected to a NIC. One or more parts of an embodiment of the invention may be implemented using different combinations of software, firmware, and/or hardware.

A network device (ND) (also referred to as a network node or node, and these terms are used interchangeably in this disclosure) is an electronic device in a communications network. The network device (e.g., a router, switch, and bridge) is a piece of networking equipment, including hardware and software that communicatively interconnects other equipment on the network (e.g., other network devices, end systems). Some network devices are "multiple services network devices" that provide support for multiple networking functions (e.g., routing, bridging, VLAN (virtual LAN) switching, Layer 2 aggregation, session border control, Quality of Service, and/or subscriber management), and/or provide support for multiple application services (e.g., data, voice, and video). Subscriber end systems (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes)

access content/services provided over the Internet and/or content/services provided on virtual private networks (VPNs) overlaid on (e.g., tunneled through) the Internet. The content and/or services are typically provided by one or more end systems (e.g., server end systems) belonging to a service or content provider or end systems participating in a peer to peer service, and may include, for example, public webpages (e.g., free content, store fronts, search services), private webpages (e.g., username/password accessed webpages providing email services), and/or corporate networks over VPNs. Typically, subscriber end systems are coupled (e.g., through customer premise equipment coupled to an access network (wired or wirelessly)) to edge network devices, which are coupled (e.g., through one or more core network devices) to other edge network devices, which are coupled to other end systems (e.g., server end systems). A network device is generally identified by its media access (MAC) address, Internet protocol (IP) address/subnet, network sockets/ports, and/or upper open systems interconnection (OSI) layer identifiers.

An interconnection node (node also being referred to as network device) is an Ethernet ring node that is common to two or more Ethernet rings or to a sub-ring and an interconnected network. At each interconnection node, there may be one or more Ethernet rings that can be accessed through a single ring port and not more than one Ethernet ring that is accessed by two ring ports. The former set of Ethernet rings is comprised of sub-rings, whereas the latter Ethernet ring is considered a major ring, relative to this interconnection node.

A major ring is an Ethernet ring that is connected on two ports to an interconnection node. A sub-ring is an Ethernet ring that is connected to (an)other Ethernet ring(s) or network(s) through the use of a pair of interconnection nodes. On their own, the sub-ring links do not form a closed loop. A closed connection of traffic may be formed by the sub-ring links and one or more links, which are controlled by (an)other Ethernet ring(s) or network(s), between interconnection nodes.

A ring protection link (RPL) is a link designated to be blocked during an idle state of an Ethernet ring protection switch (ERPS) network to prevent loop in a ring of the ERPS network. A RPL owner is a node connected to RPL and blocks traffic on the RPL during the idle state and unblocks traffic during protected state.

An automatic protection switching (APS) channel is a ring-wide virtual local area network (VLAN) used exclusively for transmission of OAM messages including R-APS messages.

A ring-automatic protection switch (R-APS) virtual channel provides R-APS connectivity between an interconnection node and another interconnection node of the same sub-ring.

A filtering database (FDB) flush includes removing MAC addresses learned on the ring ports of a protected Ethernet ring from the Ethernet ring node's filtering data. Each ERP instance may flush on the FDB for the VLAN identifiers (VIDs) of the traffic channels of the set of VLANs it is assigned to protect.

ERPS Network with Multiple Rings

An Ethernet ring protection switch (ERPS) network implements protection switching mechanisms for Ethernet layer ring topologies. The ERPS network provides protection for Ethernet traffic in a ring topology, while ensuring that no loops are within the ring at the Ethernet layer. The loops are prevented by blocking traffic on either a predetermined link or a failed link.

The loop prevention in an ERPS network is achieved by ensuring that, at any moment, traffic can flow on all but one of the ring links, the Ring Protection Link (RPL), where the link is blocked in a normal state of the ring. When a node on an ERPS ring detects a link failure, an R-APS signal failure message is multicast to all the nodes on the ring, and the end-point ports coupled to the failed link are blocked. When the RPL owner receives the message, it unblocks the RPL link and triggers protection switching, and a new traffic pattern is established on the ring. The blocked ports are then moved to the nodes coupled to the failed links. While these ERPS operations on one ring are defined in the standards and understood by person of ordinary skill in the art, ERPS operations on multiple rings in an ERPS network are more complicated and the standards have not provided mechanism to achieve the best network performance on multiple rings in an ERPS network.

Figure 1:
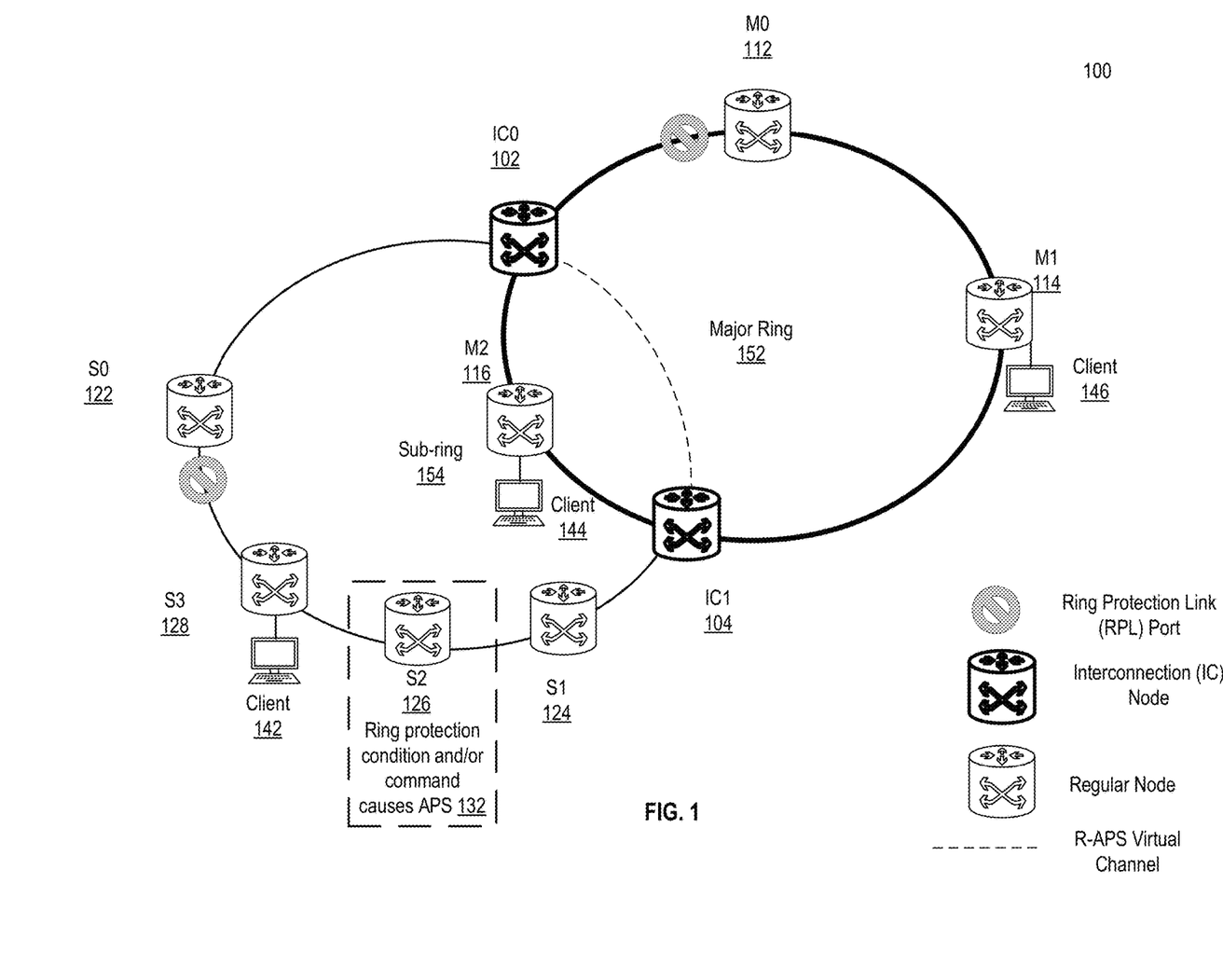
FIG. 1 shows an Ethernet ring protection switch (ERPS) network with multiple rings.

FIG. 1 shows an Ethernet ring protection switch (ERPS) network with multiple rings. Network 100 contains a major ring 152 and its sub-ring 154. The major ring 152 may be coupled to multiple sub-rings, thus sub-ring 154 is just an example of other sub-rings that may also be coupled to the major ring 152. The major ring includes nodes M0-M2 ("M" denoting major node) at references 112-116, and interconnection nodes IC0-IC1 ("IC" denoting interconnection node) at reference 102 and 104. The interconnection nodes IC0-IC1 is a part of the sub-ring 154, which also includes nodes S0-S3 ("S" denoting sub-ring node) at references 122-128.

The RPL owner on the major ring 152 is node M0, and the corresponding RPL port is shown. Similarly, the RPL owner on the sub-ring 154 is S0, and the corresponding RPL port is shown. A sub-ring may be implemented with or without an R-APS virtual channel. When an R-APS virtual channel is implemented, the virtual channel to tunnel R-APS messages from one interconnection node to the other interconnection node is established. Without the R-APS virtual channel, the R-APS channel is terminated at the interconnection nodes and its R-APS messages are not tunneled between the interconnection nodes. Embodiments of the invention is agnostic to the existence of the R-APS virtual channel between interconnection nodes (thus the R-APS virtual channel is shown using a dotted link).

Each node on an ERPS ring contains an Ethernet ring protection (ERP) instance. An instance may include one or more ERP ring ports, a control VLAN that carries R-APS messages, and one or more protected data VLANs that the instance protects when the ring fails. The ERP ring ports are physical interface ports or interface link aggregation groups (LAGs) that are used by an instance. In the major ring, all nodes have two ERP ring ports, often referred to as east and west ring ports.

The R-APS messages are carried over the R-APS channel, which may be implemented using a VLAN. Each ERP instance may use a tag-based VLAN called the raps-channel for sending and receiving. R-APS messages. The VLAN have the ERP ring ports of a ring as members. The R-APS VLAN monitors the ring and maintains its operational functions, and the R-APS messages flow through the ring to control the protection switching behavior.

When network 100 operates at a normal state, the RPL owners S0 and M0 block their respective RPL ports. Yet an RPL port may be unblocked and traffic on the corresponding ring may switch direction. For example, a ring failure condition on sub-ring 154 may cause the traffic on the sub-ring 154 to switch direction and the RPL port coupled to S0 to be unblocked. The ring failure may be triggered by a failure detected on a ring port, known as signal failure (SF). When an SF condition is detected on a ring link and it is determined to be a "stable" failure, Ethernet ring nodes adjacent to the failed ring link may initiate the protection switching.

The ring failure condition may be detected by S2 (e.g., for the failure of the link between S2 and S3), which may initiate an automatic protection switch (APS) on sub-ring 154. The ring failure condition is one type of ring protection conditions that cause the APS at reference 132. In normal operation, the ring protection condition is no request (NR), indicating no failure condition is detected and the ring operates in a normal state. Yet the NR ring protection condition may also be signaled when a link/node recovers from failure, thus the ring protection condition of NR may also trigger an APS to restore to the normal state.

In addition to ring protection conditions, a command issued by a node (shown at reference 132) on a ring may also cause the APS on sub-ring 154. A command may be a forced switch (FS), which forces a block on a ring port when the command is issued. When the command is issued on S2, it may force the block of the ring port to the link between S2 and S3. The command may also be a manual switch (MS), which also forces a block on a ring port when the command is issued, but the MS command has a lower priority than the FS command. The command may also be clear, which may be for clearing an active local administrative command (e.g., FS or MS), for triggering reversion before the wait to restore (WTR) or wait-to-block (WTB) timer to expires in case of revertive operation, and/or for triggering reversion in case of non-revertive operation. The command may also be lockout of protection, which disables a protection group, or replace the RPL, which moves the RPL by blocking a different ring link and unblocking the RPL permanently.

The ring protection condition and/or command at reference 132 on the sub-ring 154 may cause an APS, which changes the blocking location (e.g., from the link between S0 and S3 to the link between S2 and S3) in the sub-ring 154. Since a sub-ring needs the interconnection nodes on the sub-ring and its major ring to be fully closed, the interconnection nodes IC0 and IC1 will be notified of the ring protection condition and/or command. The notification is referred to as a topology change notification (TCN) as the APS causes topology change in the sub-ring 154 (e.g., the blocking location changes from the link between S0 and S3 to the link between S2 and S3).

The topology change notification about the sub-ring (in a TCN message format or otherwise) needs to be propagated on the main ring since some nodes on the main ring may need to update their paths as well (note that the interconnection nodes IC0 and IC1 may or may not update their paths), based on the ring protection condition and/or command on the sub-ring 154. For example, traffic between clients 142 and 144 goes through a path of S3-S2-S1-IC1-M2, when the link between S0 and S3 is blocked. When the ring protection condition and/or command causes APS at reference 132, the link between S2 and S3 is blocked instead. The traffic between clients 142 and 144 now needs to go through the path of S3-S0-IC0-M2. That is, not only the filtering databases (FDBs) of interconnection nodes IC0 and IC1 needs to be flushed, the main ring node M2 needs to be flushed too: the traffic path for client 144 on the major ring 152 is also changed due to the ring protection condition and/or command on the sub-ring. Thus, the FDBs of the main ring node M2 needs to be flushed to ensure that traffic between clients 142 and 144 is transmitted properly. After the FDB of a node is flushed, its MAC table is emptied, and it may re-learn the MAC addresses from the traffic (a sequence of packets) and populate its MAC table.

Yet the propagation of the notification on the main ring may cause other nodes to flush their FDBs as well. Such FDB flush is not necessary for other nodes, since the traffic paths for these nodes (e.g., nodes M0 and M1) on the major ring does not change except the portion between the two interconnection nodes. For example, traffic between clients 142 and 146 goes through the path of S3-S2-S1-IC1-M1 before the APS, and it will go through the path of S3-S0-IC0-M2-IC1-M1 after the APS. That is, other than the interconnection nodes and the one or more nodes between the interconnection nodes, no other nodes on the major ring need to flush their FDBs. Note that when the RPL of the major ring is between the two interconnection nodes, the topology change of the sub-ring affects the traffic direction on the major ring (e.g., traffic path switches from IC1-M2 to IC0-M2), thus all the major ring nodes would need to flush their respective FDBs and the selective FDB flush is not necessary.

A topology change of a sub-ring, may not affect the operations of all nodes in the major ring. Yet the standard operation (e.g., as specified in ITU-T G.8032) is to perform FDB flush on all major ring nodes upon receiving the TCN. This will result in unnecessary FDB flush, which will in turn cause flooding and leading to extended traffic outage in the major ring. Instead of indiscriminately flushing FDB of all the nodes in the major ring, which is unnecessary, wasteful, and may cause unwarranted service outage. Embodiments of the invention minimize/eliminate such FDB flush thus makes an ERPS network operate more efficiently.

A First Set of Embodiments

As discussed above, a ring condition update on a sub-ring and/or a command issued by a node on the sub-ring causes the issuance of the topology change notification (TCN) message to the interconnection node of the sub-ring, and its major ring. The notification is necessary as other than the interconnection nodes, some nodes on the major ring (e.g., node M2) need to flush their FDB to ensure that traffic (e.g., the one sourced from or destined to a node on its sub-ring whose topology has changed) is transmitted properly. In other words, flushing the FDBs of the interconnection nodes only (e.g., through internally notifying the major ring instance on the interconnection nodes IC0 and IC1) is insufficient, and the FDBs of any nodes between the two interconnection nodes (e.g., node M2) need to be flushed as well, so that these nodes (the interconnection nodes and the nodes between the interconnection nodes) may re-learn the MAC addresses and the traffic along the protected data VLANs can flow properly. On the other hand, the nodes that are on the major ring, but not between the two interconnections, should not perform a FDB flush due to the topology change on the sub-ring.

Figure 2:
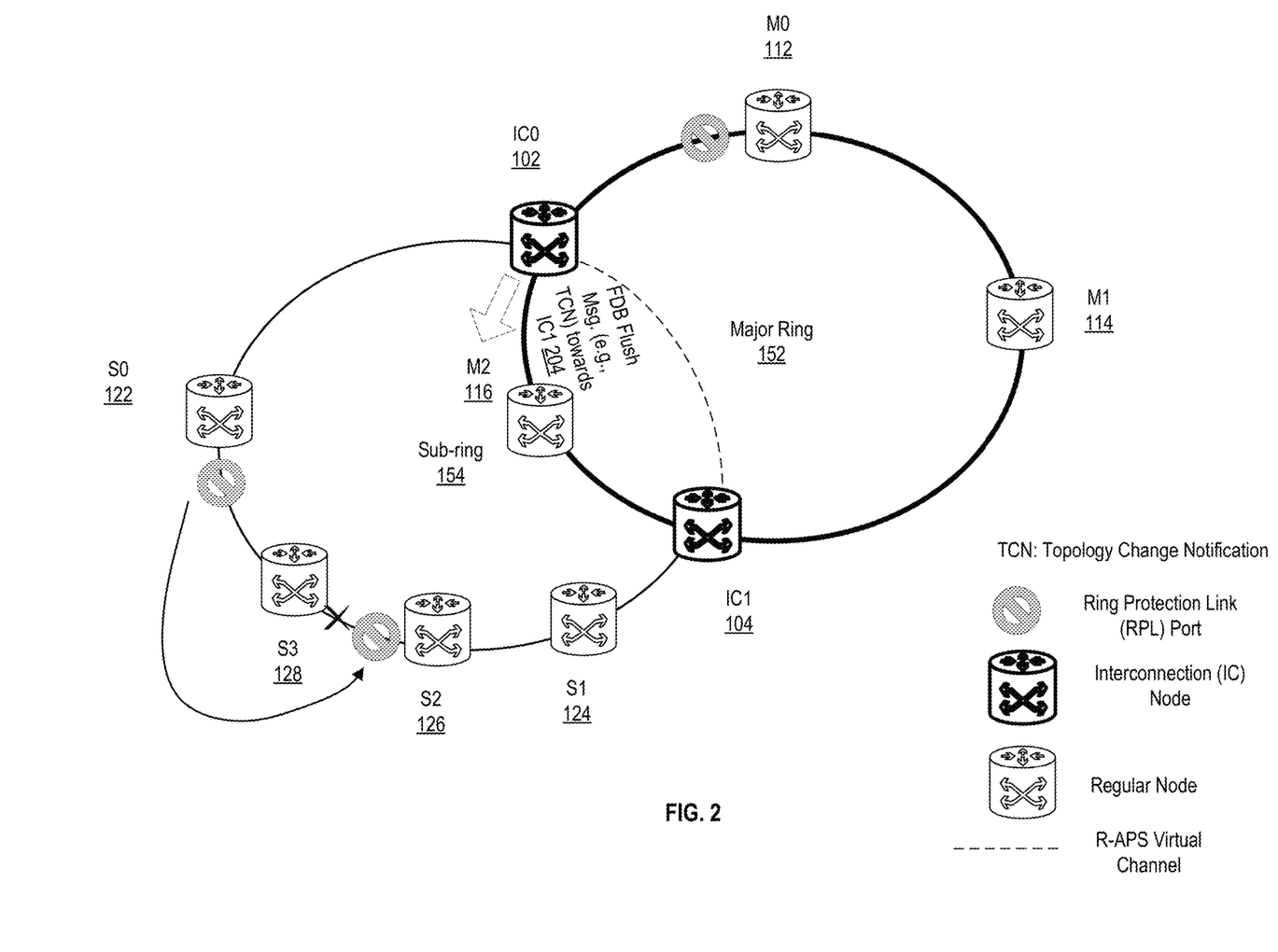
FIG. 2 shows the selective flushing filtering databases on a major ring of an Ethernet ring protection switching (ERPS) network per first set of embodiments of the invention.

FIG. 2 shows the selective flushing filtering databases on a major ring of an Ethernet ring protection switching (ERPS) network per first set of embodiments of the invention. FIG. 2 shows a network similar to the one in FIG. 1, and a link failure of the link between S2 and S3 causes the RPL moves to from the link between S0 and S3 to the link between S2 and S3. Note that other ring protection conditions and commands issued by a sub-ring node (e.g., node S2 or S3) discussed above may also cause the topology change of the sub-ring (e.g., the relocation of the RPL and/or RPL port of the sub-ring), and thus a topology change notification (TCN) message will be sent to the interconnection nodes of the major ring 152 and sub-ring 154 due to the one or more of the ring protection conditions and commands.

Instead of flooding the major ring with the TCN and transmitting the TCN to all the nodes on the major ring, interconnection node IC0 terminates the received TCN, and then transmits a FDB flush message only towards the other interconnection node that is shared between the major ring and the sub-ring for which the TCN is generated at reference 204. That is, other non-impacted nodes on the major ring, does not receive a notification of the sub-ring topology change (in the format of a FDB flush message, a TCN, or otherwise), and without receiving the notification, these non-impacted nodes do not flush their FDBs.

The transmittal of the FDB flush message needs to identify the link towards the other interconnection node. The identification may be accomplished in a variety of ways. It may be determined by the ERPS network when the network topology of the major ring 152 is known. For example, when the network topology of major ring 152 is known, interconnection IC0 may determine which of its east or west ring port is coupled to the link toward the other interconnection node IC1. The identification may be done by a user configuration. For example, the user configuration may use a command to set the link towards the other interconnection node. The command may take the format of "port0 {port-|lag} <port id/lag id> ic-link" and is-link specifies the link toward the other interconnection node. The interconnection node IC0 transmits the FDB flush message using the link as identified.

Note that once the FDB flush message ((in the format of a FDB flush message, a TCN, or otherwise) arrives at the other interconnection node, the other interconnection node terminates the message and does not forward towards the next major ring node (thus avoiding the message flooding the major ring). One way for the other interconnection node to determine whether it should terminate the message is to identify for which sub-ring the message is triggered. The other interconnection node may, by examining the message's node ID, determine the message is triggered by a topology change of a sub-ring. The node ID is unique in the ERPS network and may specify the ring for which the message is triggered (e.g., using a ring ID). When the other interconnection node determines that the message is triggered by topology change of a sub-ring, of which itself is an interconnection node, the other interconnection node terminates the message. Obviously, the other interconnection node may use other ways to determine whether to terminate the message.

Also note that a node (e.g., node M2) on the major ring and between the two interconnection nodes may receive the FDB flush message from both interconnection nodes (e.g., one from IC0 and the other from IC1). The node will resolve any race condition if arises per standard requirements (e.g., ITU-T G.8032).

Second Set of Embodiments

Upon an interconnection node receiving a topology change notification from a sub-ring, the first set of embodiments transmits the FDB flush message only towards the other interconnection node that is shared between the major ring and the sub-ring. The other major ring nodes, which are (1) not between the two interconnection nodes and (2) not the interconnection nodes themselves, are not aware of the topology change. The second set of embodiments transmits messages towards all other major ring nodes upon the interconnection node receiving a topology change notification from the sub-ring, but different messages are transmitted to different major ring nodes, depending, on their roles. The identification of the link towards the other interconnection node at the interconnection node may be performed similarly as discussed above relating to the first set of embodiments.

Figure 3:
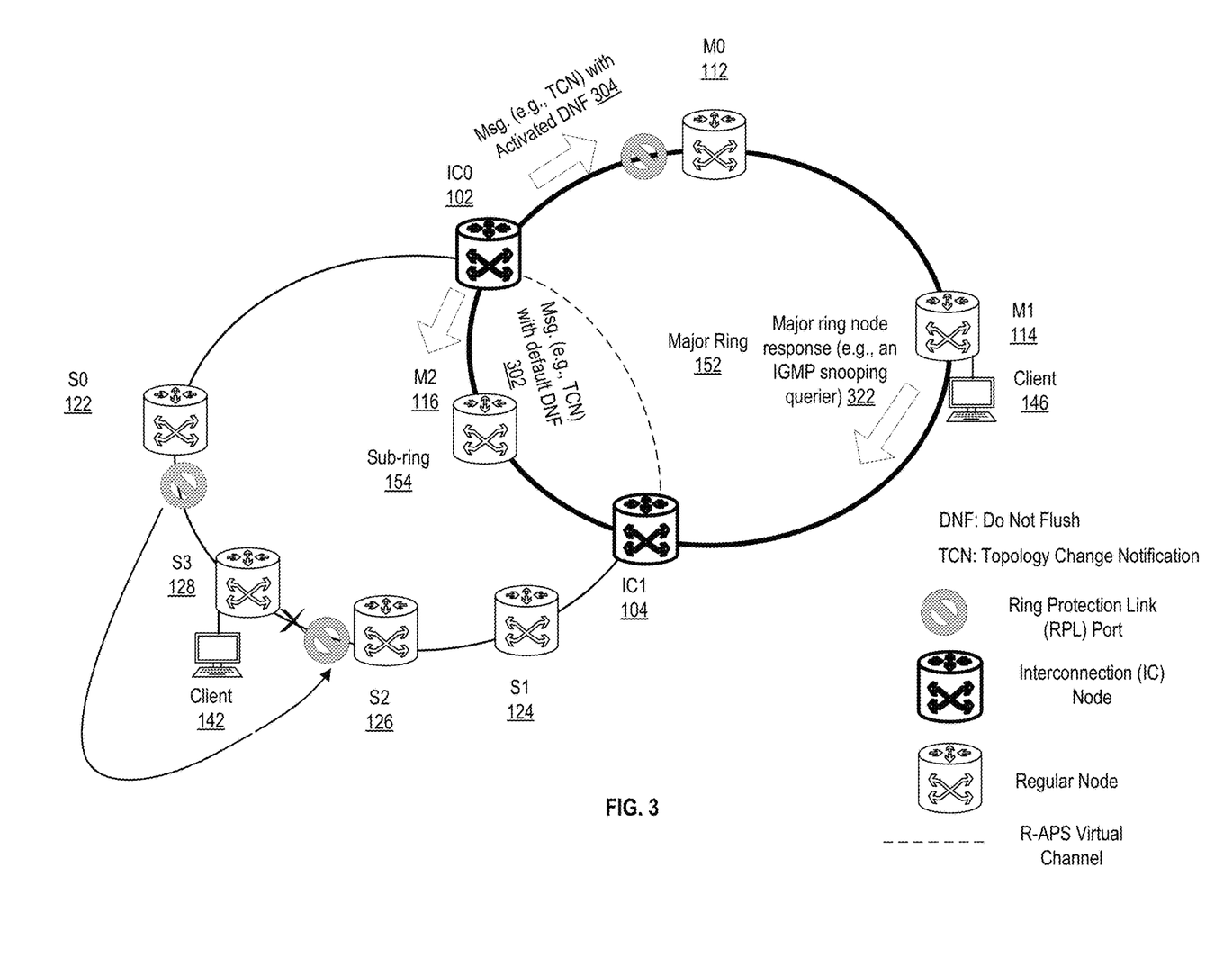
FIG. 3 shows the selective flushing filtering databases on a major ring of an Ethernet ring protection switching (ERPS) network per second set of embodiments of the invention.

FIG. 3 shows the selective flushing filtering databases on a major ring of an Ethernet ring protection switching (ERPS) network per second set of embodiments of the invention. FIG. 3 shows a network similar to the one in FIG. 2, and a link failure between the link between S2 and S3 causes the same RPL to move to the link between S2 and S3.

Upon receiving the TCN to IC0, IC0 sends a message with a default Do Not Flush (DNF) setting (e.g., DNF flag not being set) at reference 302 towards the other interconnection node, IC1. The default DNF setting is inactive, thus the message still requests the receiving node to flush its FDB. That is, the message requests M2 to flush its FDB, Note that once the message arrives at the other interconnection node IC1, IC1 terminates the message and does not forward towards the next major ring node (thus avoiding the message flooding the major ring).

In the other direction, IC0 sends a message with activated DNF setting (e.g., a DNF flag) at reference 304. The activated DNF flag indicates that the receiving node not to flush its FDB, thus M0 and M1 do not flush their respective FDBs upon receiving the message. Note that the TCN from sub-ring 154 may be also sent to IC1, which transmits different messages (with and without DNF activated) on its two directions through its ring ports (east and west ports) on the major ring 152. The receiving major ring node will resolve any race condition per standard requirements (e.g., ITU-T G.8032).

In the second set of embodiments, the major ring nodes that are not between the two interconnection nodes are notified of the sub-ring topology change using a message with an activated DNF flag. While the message does not trigger FDB flushing, it allows these major ring nodes to converge multicast traffic quickly in OSI layer 2 applications. In multicast, a source node sends traffic only to destination nodes that indicate interest to the traffic. A destination node may express its interest to the source node through messages such as an internet group management protocol (IGMP) report message to the source node.

When a sub-ring topology changes, the traffic sourced from the sub-ring to the major ring may stop and the major ring nodes will no longer receive the traffic. Upon receiving the message with an activated DNF flag, a major ring node that is not between the two interconnection nodes may send an IGMP query message (e.g., an IGMP snooping querier) at reference 322 towards the sub-ring, since the topology of the sub-ring has changed. The IMGP query message is sent out periodically by a host, and the message with the activated DNF flag on the major ring causes a host coupled to a major ring node to send out the IMGP query message. A client in the sub-ring may then send an IGMP report message in response to the IGMP query message in the new topology of sub-ring and the IMGP traffic may then go through the new path. The message with the activated DNF flag may indicate a sub-ring node, for which the sub-ring topology change is triggered (e.g., node S2 that detects a ring protection condition change or that issues a command to cause the APS), and the major ring node may send its IGMP query message towards the sub-ring node. For example, client 146 (coupled to M1 in major ring 152) includes an IGMP server, and client 142 (coupled to S3 in sub-ring 154) includes a client of the IGMP server. The IGMP traffic would go through path M1-IC1-S1-S2-S3 prior to the topology change, which moves the RPL from the link between S0 and S3 to the one between S3 and S2. With the topology change and upon receiving the message with the activated DNF flag, M1 may send an IGMP query message towards S2, for the sub-ring topology change is caused by S2. The IGMP query message from M1 may also be sent towards S3, when S3 is the client of the multicast traffic sourced from M1. That is, the IGMP query message (sent by a major ring node upon receiving the message with activated DNF flag) may be sent towards a client of the JUMP application in a sub-ring or towards the sub-ring node that causes the topology change. Upon receiving the IGMP query message, client 142 (coupled to S3) responds with an JUMP report message along the new path S3-S0-IC0-M2-IC1-M1. When the IMGP server at client 146 receives the IGMP report message, it updates the path for its IGMP traffic to the new path, i.e., M1-IC1-M2-IC0-S0-S3. Thus, through the message with the activated DNF flag, a major ring node may converge multicast traffic quickly in OSI layer 2 applications.

By sending messages with different DNF settings towards different directions on an interconnection node upon its receipt of a TCN, all the major ring nodes will be aware of the sub-ring topology change, but they will react differently. The one or more major ring nodes that are between the two interconnection nodes will flush their respective FDBs (as the message with default DNF requires); and the other major ring nodes that are not between the two interconnection nodes will not flush their respective FDBs (as the message with activated DNF flag requires) but they may respond with messages for their respective applications/protocols.

Messages to Major Ring Nodes Upon an Interconnection Node Receiving TCN

The messages to major ring nodes upon an interconnection node receiving, a topology change notification (TCN) may take a variety of formats. In the first set of embodiments, the FDB flush message may take the format of a topology change notification (TCN). The advantage is that the TCN message format based on a sub-ring topology update is known in the art, thus no changes are required to support the first set of embodiments. Additionally, a node that is between the interconnection nodes may be manufactured from a vendor differently from the vendor of the interconnection nodes, yet it still can parse the TCN and flush its FDB accordingly since the TCN message format is known. Similarly, the messages with different DNF settings in the second set of embodiments may also take the TCN message format. The ubiquity of TCN format is advantageous for the adoption of the embodiments of the invention.

Alternatively, the FDB flush message in the first set of embodiments and the messages with different DNF settings in the second set of embodiments may take a proprietary format so that a receiving node may perform proper operations without parsing through unnecessary information. The embodiments of the invention are not limited to any particular implementation of the message formats in the first or second sets of embodiments.

Figure 4:
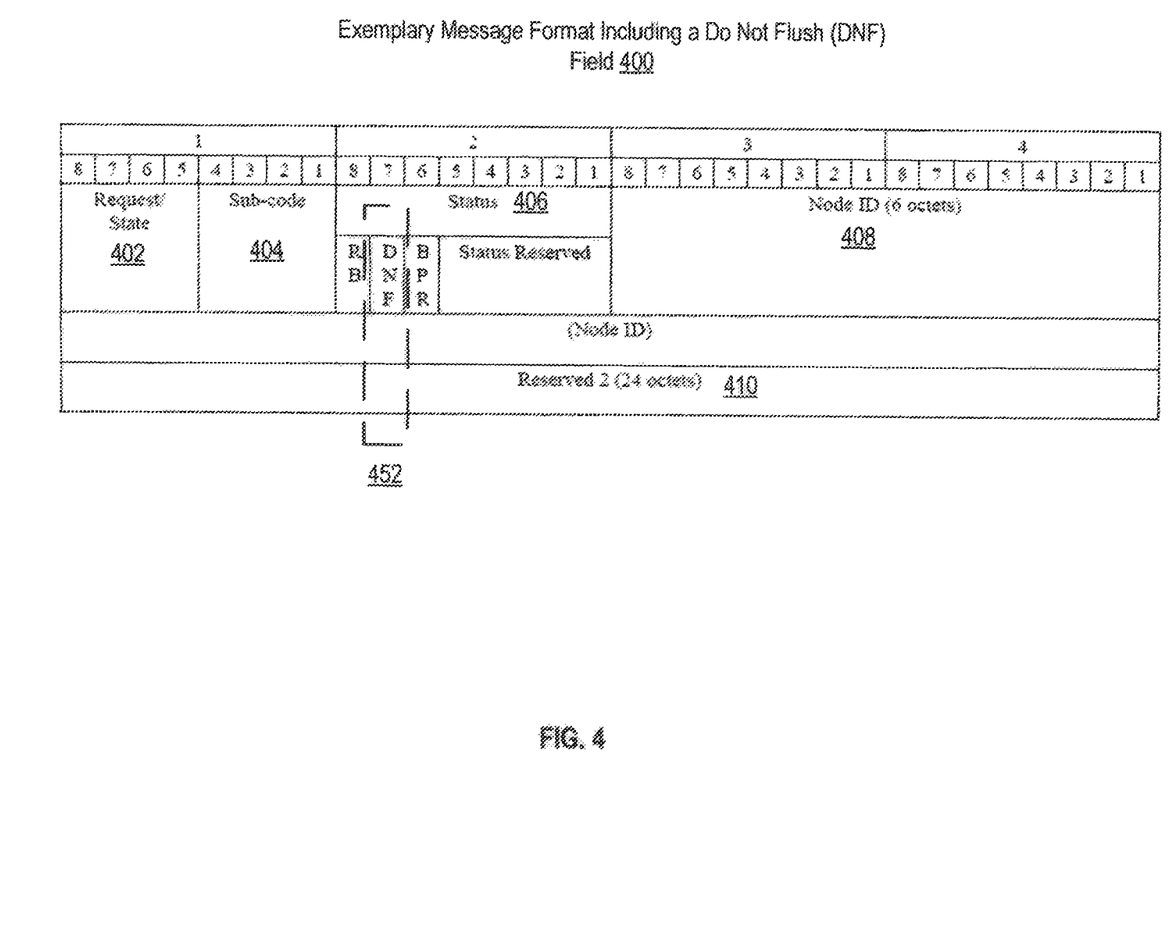
FIG. 4 shows an exemplary format of a message to major ring nodes upon an interconnection node receiving a topology change notification per some embodiments of the invention.

FIG. 4 shows an exemplary format of a message to major ring nodes upon an interconnection node receiving a topology change notification per some embodiments of the invention. The message format 400 may be used for the topology change notification, the filtering database flush message in the first set of embodiments, or the message with or without the DNF being activated in the second set of embodiments. The messages may be carried in a R-APS protocol data unit (PDU), which is one of a suite of Ethernet operations, administration, and maintenance (OAM) messages. The R-APS specific information is transmitted within specific fields in an R-APS format. FIG. 4 shows the specific fields in the R-APS format.

The message fields include a request/state field at reference 402. The request/state field includes a request/state 402, the value of which indicates a ring protection condition or a command that causes an APS, and each value in bits indicating one request/state, including forced switch (e.g., bit value 1101), event (e.g., bit value 1110), signal failure (e.g., bit value 1011), manual switch (e.g., bit value 0111), no request (e.g., bit value 0000). The request/state indicates the request/state of a sub-ring, for which the message is generated.

The message fields include a sub-code field 404, the value of which indicates particular action for some specific request/state values in reference 402. For example, when the request/state 402 indicates event (e.g. bit value 1110), the sub-code 404 may indicate a flush request (e.g., bit value 0000). In this case, the message becomes the filtering database (FDB) flush message in the first set of embodiments.

The message fields also include a status field 406, which includes a number of sub-fields. One is RB (RPL blocked) sub-field (e.g., value of 1 indicates that the RPL (e.g., the one between S0 and S3) is blocked while 0 indicates that the RPL is unblocked). The block port reference (BPR) subfield indicates which ring link is to be blocked. Another important field is do not flush (DNF) sub-field 452 (also referred to as DNF flag or DNF setting). One value (e.g., value 1) of the DNF sub-field indicates that an FDB flush should not be triggered by the reception of this message, while another value (e.g., value 0) of the DNF sub-field indicates that an FDB flush may be triggered by the reception of this message. The DNF sub-field 452 may be used to implement the second set of embodiments.

The message fields also include a node ID field 408, which indicates the source node of the message (e.g., the source node ID may indicate S2). The node ID may be an MAC address unique to the node. The node ID may include bits to indicate a ring ID, which identifies the ring for which the message is generated. For example, the node ID may include an octet (e.g., the last octet) that is the ring ID, and the ring ID is included in the node ID when the message is generated. For example, interconnection node IC0 may include the ring. ID of sub-ring 154 when it generates the messages towards M0 and M1 (discussed relating to FIGS. 2-3). When the other interconnection node IC1 receives the messages, it determines (1) that the messages are for topology change of sub-ring 154 by identifying the ring ID of sub-ring 154 within the node ID of the messages, and (2) that itself is the interconnection node between major ring 152 and sub-ring 154, IC1 then terminates the messages. The message fields may also include reserved field 410 for future use.

Operations to Selectively Flush Filtering Database Per Some Embodiments

Figure 5:
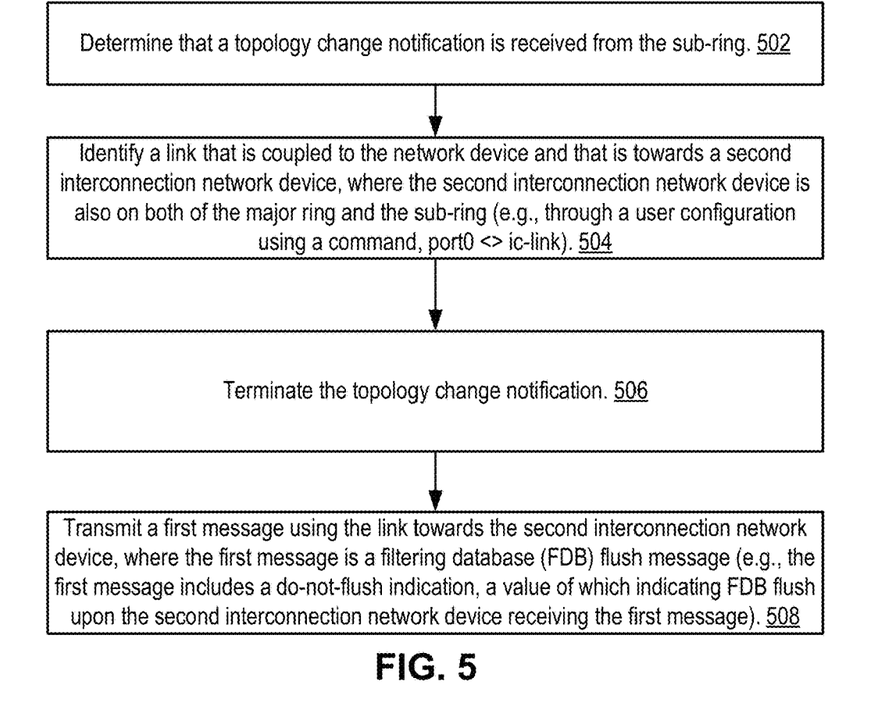
FIG. 5 is a flow diagram showing the operations to selectively flush filtering databases in a major ring of an Ethernet ring protection switching network per some embodiments of the invention.

FIG. 5 is a flow diagram showing the operations to selectively flush filtering databases in a major ring of an Ethernet ring, protection switching network per some embodiments of the invention. Method 500 may be performed by a network device (e.g., node IC0 discussed above) in an Ethernet ring protection switching (ERPS) network. The ERPS network comprises a major ring and a sub-ring, where the network device is a first interconnection network device that is on both major ring and sub-ring. The operation may be performed by a message controller within the network device.

At reference 502, the network device determines that a topology change notification is received from the sub-ring. The network device then identifies at reference 504 a link that is coupled to the network device and that is towards a second interconnection network device, where the second interconnection network device is also on both major ring and sub-ring. The link is identified based on a user configuration of the network device as discussed above.

At reference 506, the network device terminates the topology change notification. Upon terminating the topology change notification, the notification no longer propagates towards another major ring network device. At reference 508, the network device transmits a first message using the link towards the second interconnection network device, where the first message is a filtering database (FDB) flush message. In one embodiment, the TCN causes a sequence of consecutive messages with the same format including the first message. For example, the sequence of consecutive messages includes three messages sent towards the second interconnection network device at 5 million seconds interval.

In one embodiment, the first message includes a do-not-flush indication, a value of which indicates FDB flush upon receiving the first message as discussed relating to FIG. 4 above.

In one embodiment, the first message is received at a major ring network device that is on the major ring but not the sub-ring, where the first message causes the major ring network device to flush its FDB. One example of the major ring network device is node M2 discussed above.

In one embodiment, the first message indicates a sub-ring state for which the topology change notification is triggered. The indication of the sub-ring state is indicated by the request/state field 402 as discussed in one embodiment.

In one embodiment, the ring protection link (RPL) on the major ring is not between the two interconnection nodes. When the RPL is between the two interconnection nodes, the sub-ring topology change causes the RPL owner to flushes its FDB, and that would impact other major ring nodes, which then need to flush their respective FDBs, thus the selectively flushing FDBs on the major ring would not be necessary. When the RPL is not between the two interconnection nodes, the sub-ring topology causes only the nodes between the two interconnection nodes and the two interconnection nodes to flush their respectively FDBs, and embodiments of the invention are advantageous over prior approaches.

Figure 6:
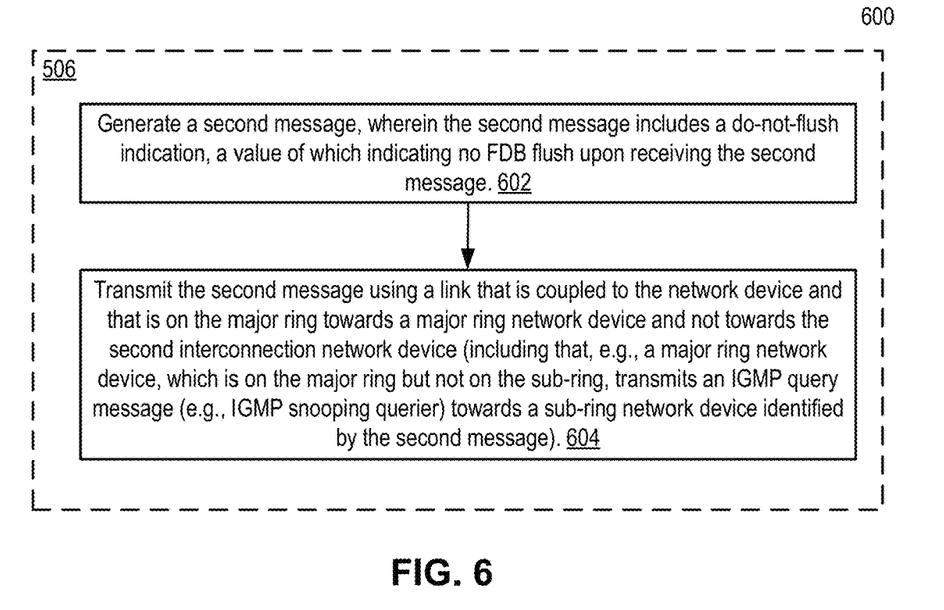
FIG. 6 is a flow diagram showing the operations to terminate the topology change notification per some embodiments of the invention.

FIG. 6 is a flow diagram showing the operations to terminate the topology change notification per some embodiments of the invention. The operations of method 600 is an embodiment of operations in reference 506.

At reference 602, the network device generates a second message, where the second message includes a do-not-flush indication, a value of which indicating no FDB flush upon receiving the second message. At reference 604, the network device transmits the second message using a link that is coupled to the network device and that is on the major ring towards a major ring network device and not towards the second interconnection network device. In one embodiment, the TCN received at reference 504 causes a first sequence of consecutive messages including the first message as discussed above relating to reference 508 and a second sequence of consecutive message including the second message. For example, both first sequence and second sequence include three messages sent at 5 million seconds interval, the formal towards the second interconnection network device and without the DNF flag being set and the latter towards the other direction of the major ring and with the DNF flag being set.

In one embodiment, the major ring network device transmits an internet group management protocol (IGMP) query message towards a sub-ring network device identified by the second message.

By selectively flushing the FDBs on the major ring based upon a sub-ring topology change, embodiments of the invention avoid the TCN flooding on the major ring, and the FDB flush message is transmitted to only the nodes that are impacted by the topology change of the sub-ring. Thus, the major ring reduces the unwarranted traffic outage and/or resource consumption due to the unnecessary FDB flush.

A Network Device Implementing Embodiments of the Invention

Figure 7:
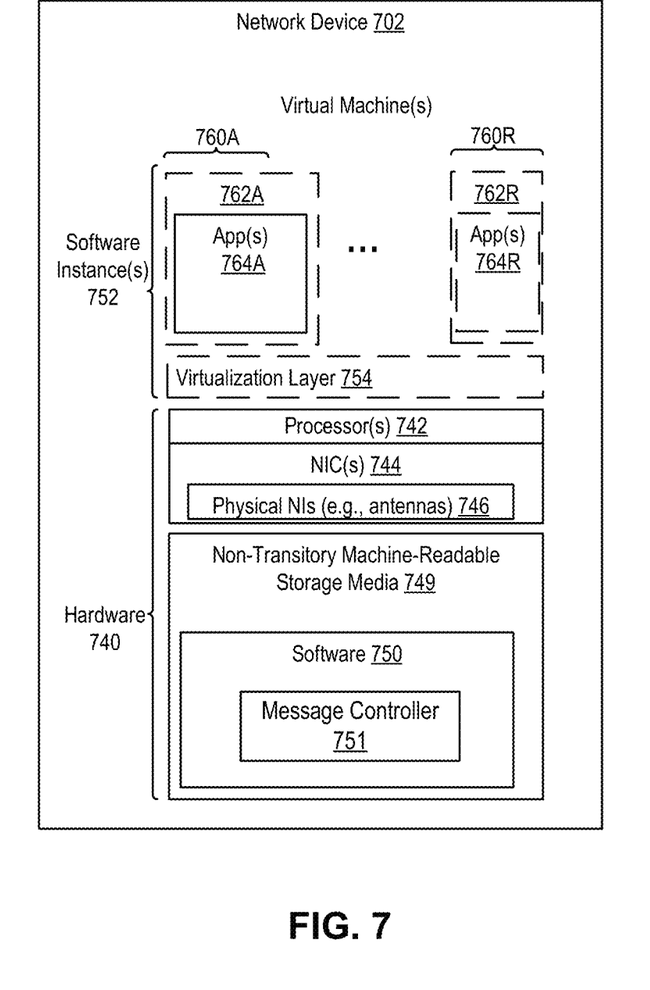
FIG. 7 shows a network device implementing the packet forwarding per some embodiments of the invention.

FIG. 7 shows a network device implementing the packet forwarding per some embodiments of the invention. The network device 702 may be implemented using custom application-specific integrated-circuits (ASICs) as processors and a special-purpose operating system (OS), or common-off-the-shelf (COTS) processors and a standard OS.

The network device 702 includes hardware 740 comprising a set of one or more processors 742 (which are typically COTS processors or processor cores or ASICs) and physical NIs 746, as well as non-transitory machine-readable storage media 749 having stored therein software 750. During operation, the one or more processors 742 may execute the software 750 to instantiate one or more sets of one or more applications 764A-R. While one embodiment does not implement virtualization, alternative embodiments may use different forms of virtualization. For example, in one such alternative embodiment the virtualization layer 754 represents the kernel of an operating system (or a shim executing on a base operating system) that allows for the creation of multiple instances 762A-R called software containers that may each be used to execute one (or more) of the sets of applications 764A-R. The multiple software containers (also called virtualization engines, virtual private servers, or jails) are user spaces (typically a virtual memory space) that are separate from each other and separate from the kernel space in which the operating system is run. The set of applications running in a given user space, unless explicitly allowed, cannot access the memory of the other processes. In another such alternative embodiment, the virtualization layer 754 represents a hypervisor (sometimes referred to as a virtual machine monitor (VMM)) or a hypervisor executing on top of a host operating system, and each of the sets of applications 764A-R run on top of a guest operating system within an instance 762A-R called a virtual machine (which may in some cases be considered a tightly isolated form of software container) that run on top of the hypervisor—the guest operating system and application may not know that they are running on a virtual machine as opposed to running on a "bare metal" host network device, or through para-virtualization the operating system and/or application may be aware of the presence of virtualization for optimization purposes. In yet other alternative embodiments, one, some, or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 740, directly on a hypervisor (in which case the unikernel is sometimes described as running within a LibOS virtual machine), or in a software container, embodiments can be implemented fully with unikernels running directly on a hypervisor represented by virtualization layer 754, unikernels running within software containers represented by instances 762A-R, or as a combination of unikernels and the above-described techniques (e.g., unikernels and virtual machines both run directly on a hypervisor, unikernels and sets of applications that are run in different software containers).

The software 750 contains a message controller 751 that performs operations described with reference to FIGS. 1-6. The message controller 751 may be instantiated within the applications 764A-R. The instantiation of the one or more sets of one or more applications 764A-R, as well as virtualization if implemented, are collectively referred to as software instance(s) 752. Each set of applications 764A-R, corresponding virtualization construct (e.g., instance 762A-R) if implemented, and that part of the hardware 740 that executes them (be it hardware dedicated to that execution and/or time slices of hardware temporally shared), forms a separate virtual network device 760A-R.

A network interface (NI) may be physical or virtual. In the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address).

Some of the embodiments contemplated above are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc.

Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term "unit" may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method performed by a network device in an Ethernet ring protection switching (ERPS) network, wherein the ERPS network comprises a major ring and a sub-ring, wherein the network device is a first interconnection network device that is on both major ring and sub-ring, the method comprising:
    determining that a topology change notification is received from the sub-ring;
    identifying a link that is coupled to the network device and that is towards a second interconnection network device, wherein the second interconnection network device is also on both major ring and sub-ring;
    terminating the topology change notification; and
    transmitting a first message using only the link towards the second interconnection network device, where the first message is a filtering database (FDB) flush message.

2. The method of claim 1, wherein the link is identified based on a user configuration of the network device.

3. The method of claim 1, wherein the first message includes a do-not-flush indication, a value of which indicates FDB flush upon receiving the first message.

4. The method of claim 1, wherein terminating the topology change notification comprises:
    generating a second message, wherein the second message includes a do-not-flush indication, a value of which indicating no FDB flush upon receiving the second message; and
    transmitting the second message using a link that is coupled to the network device and that is on the major ring towards a major ring network device and not towards the second interconnection network device.

5. The method of claim 4, wherein the major ring network device transmits an internet group management protocol (IGMP) query message towards a sub-ring network device identified by the second message.

6. The method of claim 1, wherein the first message is received at a major ring network device that is on the major ring but not the sub-ring, and wherein the first message causes the major ring network device to flush its FDB.

7. The method of claim 1, wherein the first message indicates a sub-ring state for which the topology change notification is triggered.

8. A network device to be implemented in an Ethernet ring protection switching (ERPS) network, wherein the ERPS network comprises a major ring and a sub-ring, wherein the network device is a first interconnection network device that is on both major ring and sub-ring, comprising:
    a processor and machine-readable storage medium that provides instructions that, when executed by the processor, cause the network device to perform:
        determining that a topology change notification is received from the sub-ring;
        identifying a link that is coupled to the network device and that is towards a second interconnection network device, wherein the second interconnection network device is also on both major ring and sub-ring;
        terminating the topology change notification; and
        transmitting a first message using only the link towards the second interconnection network device, where the first message is a filtering database (FDB) flush message.

9. The network device of claim 8, wherein the link is identified based on a user configuration of the network device.

10. The network device of claim 8, wherein the first message includes a do-not-flush indication, a value of which indicates FDB flush upon receiving the first message.

11. The network device of claim 8, wherein terminating the topology change notification comprises:
generating a second message, wherein the second message includes a do-not-flush indication, a value of which indicating no FDB flush upon receiving the second message; and
transmitting the second message using a link that is coupled to the network device and that is on the major ring towards a major ring network device and not towards the second interconnection network device.

12. The network device of claim 11, wherein the major ring network device transmits an internet group management protocol (IGMP) query message towards a sub-ring network device identified by the second message.

13. The network device of claim 8, wherein the first message indicates a sub-ring state for which the topology change notification is triggered.

14. A non-transitory machine-readable storage medium that provides instructions that, when executed by a processor of a network device, cause the network device to perform:
determining that a topology change notification is received from a sub-ring of an Ethernet ring protection switching (ERPS) network, wherein the ERPS network comprises a major ring and the sub-ring, wherein the network device is a first interconnection network device that is on both major ring and sub-ring;
identifying a link that is coupled to the network device and that is towards a second interconnection network device, wherein the second interconnection network device is also on both major ring and sub-ring;
terminating the topology change notification; and
transmitting a first message using only the link towards the second interconnection network device, where the first message is a filtering database (FDB) flush message.

15. The non-transitory machine-readable storage medium of claim 14, wherein the link is identified based on a user configuration of the network device.

16. The non-transitory machine-readable storage medium of claim 14, wherein the first message includes a do-not-flush indication, a value of which indicates FDB flush upon receiving the first message.

17. The non-transitory machine-readable storage medium of claim 14, wherein terminating the topology change notification comprises:
generating a second message, wherein the second message includes a do-not-flush indication, a value of which indicating no FDB flush upon receiving the second message; and
transmitting the second message using a link that is coupled to the network device and that is on the major ring towards a major ring network device and not towards the second interconnection network device.

18. The non-transitory machine-readable storage medium of claim 17, wherein the major ring network device transmits an internet group management protocol (IGMP) query message towards a sub-ring network device identified by the second message.

19. The non-transitory machine-readable storage medium of claim 14, wherein the first message is received at a major ring network device that is on the major ring but not the sub-ring, and wherein the first message causes the major ring network device to flush its FDB.

20. The non-transitory machine-readable storage medium of claim 14, wherein the first message indicates a sub-ring state for which the topology change notification is triggered.

* * * * *